United States Patent [19]

Beneke et al.

[11] 4,050,557
[45] Sept. 27, 1977

[54] TWO-SPEED TRANSMISSION HAVING ENCLOSED FLYWHEEL

[75] Inventors: Jene A. Beneke, Parker, Tex.; George J. Bozich, Chicago, Ill.

[73] Assignee: Verson Allsteel Press Company, Dallas, Tex.

[21] Appl. No.: 598,350

[22] Filed: July 23, 1975

[51] Int. Cl.² ............................................. F16D 67/04
[52] U.S. Cl. .................................... 192/4 R; 74/572; 74/329; 192/18 A; 192/87.15
[58] Field of Search ......................... 74/329, 325, 572; 192/18 A, 4 R, 87.15, 87.16, 87.17, 113 B, 85 AA

[56] References Cited

U.S. PATENT DOCUMENTS

| | | | |
|---|---|---|---|
| 2,150,950 | 3/1939 | Thoma | 192/113 B |
| 2,246,673 | 6/1941 | Glasner et al. | 192/4 R |
| 2,775,330 | 12/1956 | Schjolin et al. | 192/87.16 |
| 2,860,529 | 11/1958 | Sommer | 192/4 R X |
| 2,878,909 | 3/1959 | Munschauer | 192/85 AA X |
| 3,494,450 | 2/1970 | Mankowsky et al. | 192/18 A |
| 3,561,279 | 2/1971 | Beneke | 192/4 R X |
| 3,605,963 | 9/1971 | Roob et al. | 192/18 A |
| 3,896,911 | 7/1975 | Beneke | 192/18 A |

FOREIGN PATENT DOCUMENTS

| | | | |
|---|---|---|---|
| 869,715 | 3/1953 | Germany | 192/18 A |
| 525,124 | 8/1940 | United Kingdom | 192/18 A |

Primary Examiner—Benjamin W. Wyche
Attorney, Agent, or Firm—Richards, Harris & Medlock

[57] ABSTRACT

The specification discloses a transmission system for a press. A rotatable shaft is mounted within an oil lubrication housing and a flywheel is rotatably mounted in the housing about the shaft. A shaft extends through the oil housing for transmitting rotation to the flywheel within the oil housing. Low and high speed clutch assemblies are spaced apart along the shaft and include pistons selectively movable to engage the clutch assemblies. Gears are provided to transmit rotation from the flywheel to the clutch assemblies. A brake assembly is mounted between the clutch assemblies and includes friction surfaces carried about the shaft. The brake assembly also includes a stationary housing mounted about the friction surfaces and engaging the friction surfaces to brake the shaft when the friction surfaces are engaged. Brake plates are mounted on opposite sides of the brake assembly for causing engagement of the friction surfaces. Structure rigidly interconnects adjacent pistons and brake plates such that the friction surfaces are disengaged when either of the clutch assemblies are engaged.

18 Claims, 9 Drawing Figures

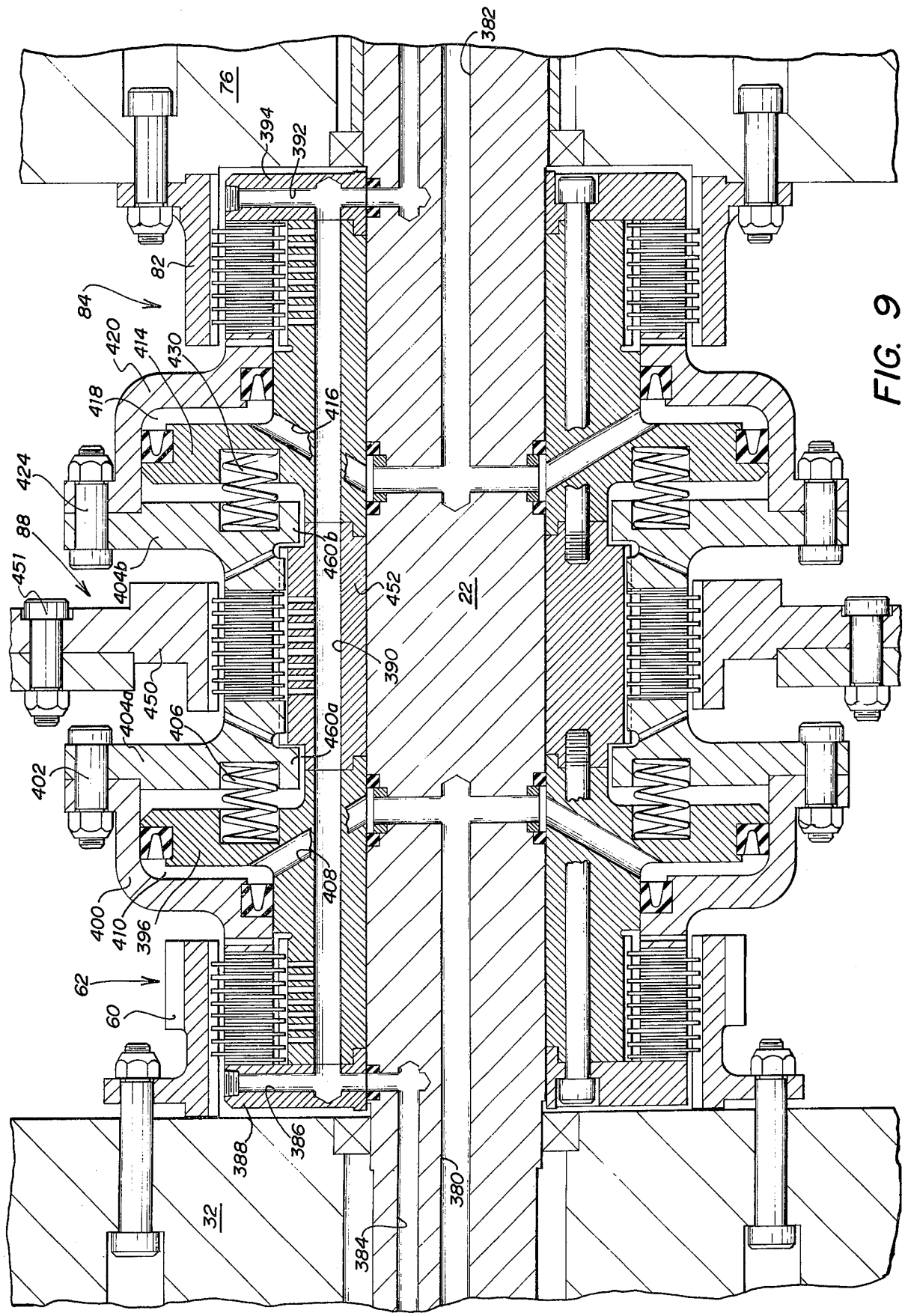

TWO-SPEED TRANSMISSION HAVING ENCLOSED FLYWHEEL

FIELD OF THE INVENTION

This application is directed to a transmission system, and more particularly is directed to a two-speed transmission system for use with metal forming machines.

THE PRIOR ART

It has heretofore been known to utilize two-speed transmissions for press machines such as press brakes and other metal forming machines. Examples of such prior systems are disclosed in U.S. Pat. No. 3,498,424, issued Mar. 30, 1970 and entitled "MULTIPLE SPEED MECHANICAL TRANSMISSION SYSTEM" and U.S. patent application Ser. No. 454,271, filed Mar. 25, 1974, and entitled "TWO-SPEED CLUTCH AND BRAKE SYSTEM".

While such prior systems have worked well in practice, it has been necessary in such systems to dispose the flywheel outside the oil housing which encloses the clutches and gears. This has necessitated oil seals at the flywheel. Moreover, such systems have required split drive shafts which necessitate very accurate alignment. Such systems have also required independent lubrication of the flywheel and its bearings. A need has thus arisen for a press transmission system wherein the flywheel may be mounted within the lubrication housing in order to eliminate and reduce the problems heretofore associated with prior transmission systems.

SUMMARY OF THE INVENTION

In accordance with the present invention, a transmission system for a press machine includes an oil housing to provide lubrication therewithin. A shaft and a flywheel are rotatably mounted within the oil housing. Structure is provided to apply rotation to the flywheel from outside the oil housing. High speed and low speed clutches are mounted adjacent the shaft within the housing. Structure is provided to selectively operate the clutches to transmit rotative motion from the flywheel to the shaft through either of the clutches.

In accordance with another aspect of the invention, a clutch system includes a rotatable shaft with a flywheel rotatably mounted about the shaft. Structure is provided to rotate the flywheel. A high speed clutch assembly includes friction clutch surfaces mounted about the shaft and engaged with the flywheel. A low speed clutch assembly is spaced from the high speed clutch assembly and includes friction clutch surfaces mounted about the shaft. Gears are provided to transmit rotative motion from the flywheel to the low speed clutch assembly. A brake assembly is disposed between the low and high speed clutch assemblies and includes a plurality of friction surfaces mounted about the shaft. Structure may be selectively operated to engage either of the clutch assemblies to transmit rotation from the flywheel to the shaft, while concurrently disengaging the brake assembly.

In accordance with yet another aspect of the invention, a clutch system includes an oil housing having a rotatable shaft and a flywheel rotatably mounted therein. Structure is provided outside the housing to rotate the flywheel. Low and high speed clutches are spaced apart along the shaft and include pistons selectively movable to engage the clutches. Gears are provided to transmit rotation from the flywheel to the clutches. A brake is mounted between the clutches and includes friction surfaces carried about the shaft. The brake also includes a stationary housing mounted about the friction surfaces and engaging the friction surfaces to brake the shaft when the friction surfaces are engaged. Brake plates are mounted on opposite sides of the brake assembly for selectively causing engagement of the friction surfaces. Structure rigidly interconnects adjacent pistons and brake plates such that the friction surfaces are disengaged when either of the clutch assemblies are engaged.

In accordance with a more specific aspect of the invention, a transmission system for a press machine includes a lubrication housing. A rotatable shaft is mounted in the housing, with a flywheel rotatably mounted about the shaft. A first speed clutch is mounted on the shaft adjacent the flywheel and includes a plurality of first friction clutch surfaces. A first gear is mounted to the flywheel and engages the outer peripheries of ones of the first friction cluch surfaces. A second speed clutch is mounted on the shaft and is spaced from the flywheel and includes a plurality of second friction clutch surfaces. A second gear is rotatably mounted on the shaft and engages the outer peripheries of ones of the second friction clutch surfaces. A third gear meshes with the first and second gears for transmitting rotation from the flywheel to the second speed clutch. Structure is provided to selectively engage either of the clutches to transmit rotation from the flywheel to the shaft.

DESCRIPTION OF THE DRAWINGS

For a more complete understanding of the present invention and for further objects and advantages thereof, reference is now made to the following description taken in conjunction with the accompanying drawings, in which:

FIG. 9 is a sectional view of an alternative embodiment of a clutch and brake system for use with the system shown in FIG. 1.

DESCRIPTION OF THE PREFERRED EMBODIMENT

Figure 1:
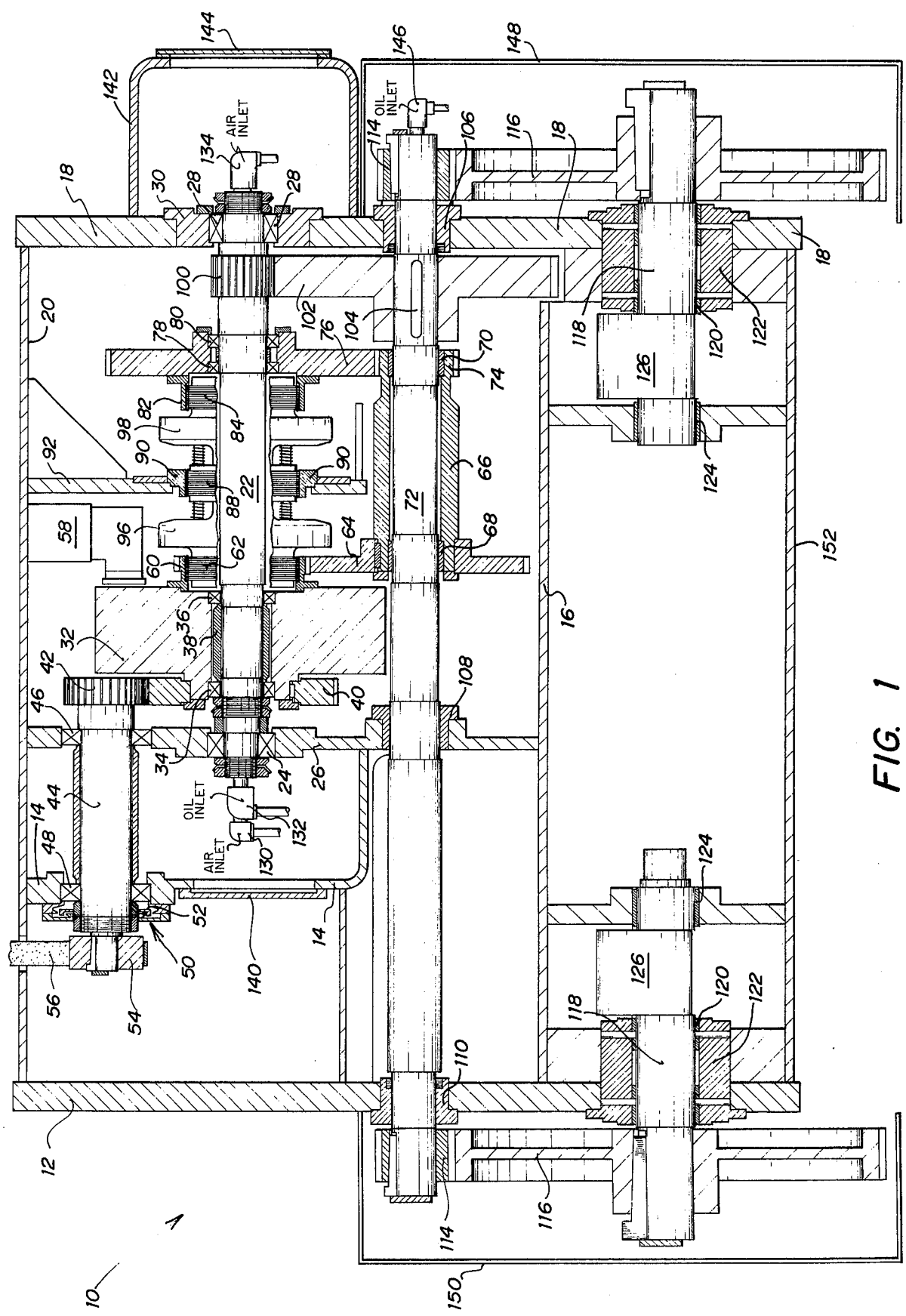
FIG. 1 is a partially sectioned view of the preferred embodiment of the invention.

Referring to FIG. 1, a transmission 10 is illustrated which is particularly useful for a metal forming machine such as a press brake system. A housing 12 supports the transmision, with an oil tight lubrication housng being defined by housing walls 14, 16, 18 and 20. The oil housing thus formed encloses an area in which mechanical transmission of the invention operates with oil lubrication being applied thereto.

A rotating shaft 22 is journaled for rotation at one end by bearings 24 and oil seals which are mounted in the housing wall 26. The other end of the shaft 22 is journaled in bearings 28 which are mounted within an annular bearing housing 30. Bearing housing 30 is attached by suitable bolts to the housing wall 18.

A flywheel 32 is rotatably mounted on shaft 22 by bearings 34 and 36. A bearing spacer 38 is disposed between the bearings 34 and 36. The flywheel 32 is thus disposed within the oil housing, and expensive oil seals are not required between the flywheel and the shaft 22. A flywheel gear 40 is fixedly attached to one side of the flywheel 32 and includes gear teeth which mesh with a drive gear 42. Drive gear 42 is attached to an end of a flywheel pinion shaft 44 which is journaled in bearings 46 and 48 in housing walls 26 and 14.

The end of the pinion shaft 44 is directed through an oil seal 50 which includes an oil slinger 52. An oil drain is provided in the lower portion of the oil seal. The end of the pinion shaft 44 thus extends outward from the enclosed oil housing in order to receive drive through a sprocket or pulley 54. In the preferred embodiment, a belt 56 is connected to a motor, to be subsequently shown, in order to rotate the pulley 54. Alternatively, a chain may be utilized to drive a sprocket in order to rotate the pinion shaft 44. Rotation of the pinion shaft 44 provides rotation through the gears 40 and 42 to the flywheel 32.

A flywheel brake pad 58 is provided adjacent flywheel 32. A first reduction pinion 60 is attached by bolts or the like to a face of the flywheel 32. Reduction pinion 60 engages the outer periphery of ones of a plurality of friction clutch surfaces which form a high speed clutch 62. Teeth formed on the exterior of the reduction pinion 60 engage the teeth of a first reduction gear 64 which is keyed to an idler gear shaft 66. The gear shaft 66 is rotatably mounted by bushings 68 and 70 about an intermediate shaft 72. A second reduction pinion 74 is formed on the end of the idler shaft 66 and meshes with teeth on a second reduction gear 76. Gear 76 is journaled in bearings 78 and 80 about shaft 22. A clutch drive ring 82 is rigidly attached to one face of the gear 76 and engages the outer periphery of ones of a plurality of friction clutch surfaces which form a low speed clutch 84.

A brake assembly is disposed between the high speed and low speed clutches 62 and 84 and comprises a plurality of annular friction surfaces 88. A brake spline 90 is rigidly attached to a wall 92 and contacts outer peripheries of ones of the fricton surfaces forming the brake assembly. Clutch pistons and brake plates, to be subsequently described, are disposed within housings 96 and 98.

A drive pinion 100 is rigidly formed on an end of the shaft 22 and meshes with an intermediate gear 102. Gear 102 is attached by a key 104 to the intermediate shaft 72. Intermediate shaft 72 is journaled in a bushing 106 in housing wall 18. Intermediate shaft 72 is also journaled in bushings 108 in housing wall 26 and in bushings 110 in the wall of housing 12. The intermediate shaft 72 is surrounded by and supports the idler gear shaft 66 in the manner previously described.

The outer ends of the intermediate shaft 72 are connected to bull pinions 114, each of which mesh with a bull gear 116. Bull gears 116 are connected to bull gear shafts 118 which are mounted in bushings 120 carried by main bushing housing 122. Inner main bushings 124 support the inner ends of the bull gear shafts 118. Bull cams 126 are thus rotated to provide drive to a metal forming machine such as a press brake, in the well-known manner.

The clutches 62 and 84 of the present system are operated by pressurized air, although it will be apparent that other pressurized fluid can be utilized for energization of the clutches. An air inlet 130 comprises a rotary union which is attached to the rotating end of shaft 22 in order to supply pressurized air through apertures in the shaft, as will be subsequently described. An oil inlet 132 is connected to a source of pressurized oil and also comprises a rotary union connected to the end of shaft 22 in order to supply lubricating oil through apertures in the shaft 22 to the clutches. An air inlet 134 comprises a rotary union connected to a source of pressurized air in order to admit air through passages in the opposite end of shaft 22 for energization of the low speed clutch 84. The air inlet 130 and oil inlet 132 are disposed in a space formed between housing walls 14 and 26. A cover plate 140 may be removed from wall 14 for access to the air and oil inlets. Air inlet 134 is covered by a wall 142 attached to housing wall 18. Cover 144 may be removed for access to the air inlet 134.

An oil inlet 146 comprises a rotary union attached to the end of intermediate shaft 72 and attached to a source of pressurized oil for lubrication. A housing cover 148 is disposed over the oil inlet 146 and the bull drive gears 116. A housing cover 150 covers the other bull gear assembly. A bottom housing 152 is connected beneath housing walls 12 and 18 in order to encompass the bull drive system.

In operation of the system shown in FIG. 1, if pressurized air is not applied to either the high speed clutch 62 or the low speed clutch 84, the friction surfaces 88 are energized, thereby braking rotation of shaft 22. In the brake position, the flywheel 32 is continuously rotated about shaft 22 by rotation of the pinion gear 42. When it is desired to operate the system in high gear, pressurized air is applied through the air inlet 130 in order to energize the high speed clutch 62. In a manner to be subsequently described, the clutch surfaces 72 are compressed in order to provide rotative drive from the flywheel 32 through the reduction pinion 60 and the clutch surfaces 62 to the shaft 22. Shaft 22 is then rotated at the high speed, and the drive pinion 100 causes rotation of an intermediate gear 102 which rotates the intermediate shaft 72. Rotation of intermediate shaft 72 causes rotation of the bull gears 116 and the cams 128. During operation in the high speed, the idler gear shaft 66, gear 64 and pinion 74 are rotated, thereby causing rotation of gear 76. However, inasmuch as the low speed clutch sufaces 84 are not energized, drive is not imparted from the gear 76 to the shaft 22.

When it is desired to operate the shaft 22 in the low speed, pressurized air is applied through the air inlet 134 in order to compress the clutch surfaces 84. The high speed clutch surfaces 62 and the brake friction surfaces 88 are not energized in this mode. The flywheel 32 thus transmits rotation through idler gear 64 and pinion 74 to the second reduction gear 76. Gear 76 then transmits rotation through the engaged clutch surfaces 84 to the shaft 22 for rotation of the shaft 22 in a low speed. The drive pinion 100 thus causes rotation of the bull gears through the intermediate shaft 72 at the low speed. When both of the high speed and low speed clutches are de-energized, the brake is automatically set in order to terminate rotation of shaft 22, thereby stopping rotation of the bull gears 116.

As previously noted, the present invention utilizes only a single shaft 22, and does not require two accurately aligned split shafts arranged in an end-to-end relationship as in previously developed transmissions. Moreover, the flywheel 32 is maintained within the oil housing, and is therefore automatically lubricated and expensive oil seals are not required between the flywheel and the drive shaft.

Figure 2:
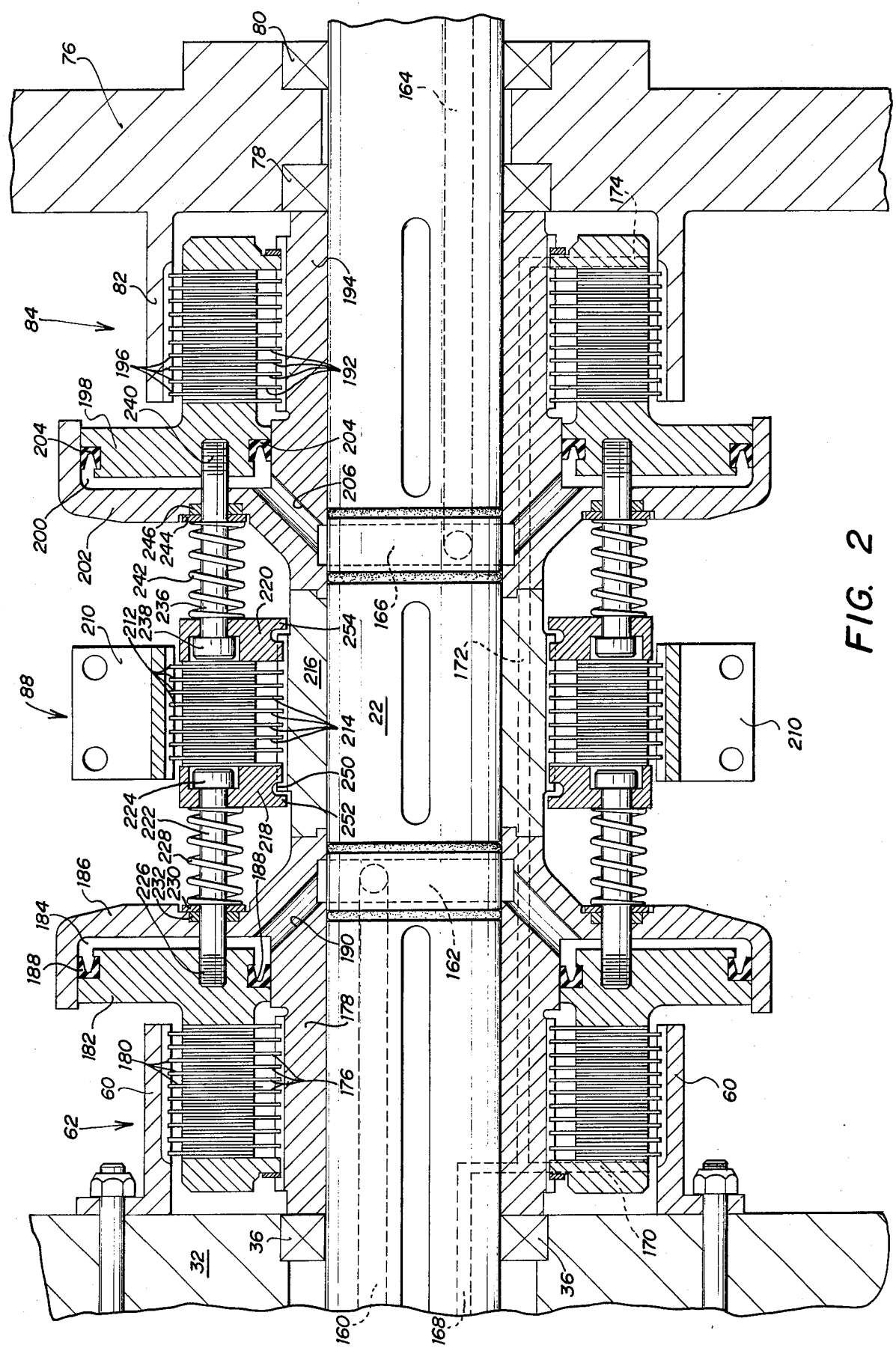
FIG. 2 is a partially sectioned view of the clutch and brake assembly of FIG. 1.

FIG. 2 illustrates in greater detail the construction of the clutch and brake system utilized in the system shown in FIG. 1. Like numerals are utilized for like and corresponding parts in the various drawings. An aperture 160 is formed in the end of shaft 22 and communicates with the air inlet 130 which is shown in FIG. 1. Pressurized air is directed through the aperture 160 to a circumferential groove 162 formed in shaft 22. Similarly, an aperture 164 is formed in the opposite end of shaft 22 and communicates with the air inlet 134 previously described. Air passes through the aperture 164 to a circumferential groove 166 formed about the shaft 22. Oil is provided from the oil inlet 132 to an aperture 168 formed in the shaft 22. Oil is provided through an aperture 170 to the high speed clutch 62 and through an aperture 172 and 174 to a low speed clutch 84.

As previously noted, the high speed clutch 62 comprises a plurality of annular friction clutch surfaces. A first set of the friction clutch surfaces 176 are keyed at their inner periphery to annular body 178 which is keyed to rotate with shaft 22. A second set of annular friction clutch surfaces 180 are alternatively disposed between surfaces 176 and are keyed at their outer peripheries to the reduction pinion 60. A clutch piston 182 is slidably movable within a cylinder 184 formed in a housing 186. Air seals 188 are formed between the piston 182 and the cylinder 184. An air passage 190 communicates with the groove 162. When the high speed clutch 62 is de-energized, the friction clutch surfaces 176 and 180 rotate relative to one another and drive is not imparted from the reduction pinion 60 to the shaft 22. When pressurized air is applied through aperture 160 groove 162 and through passageway 190, the clutch piston 182 is forced against the friction clutch surfaces 176 and 180. Friction clutch surfaces 176 and 180 are thereby engaged, transmitting rotative motion from the flywheel 32 through the pinion 60 to the shaft 22.

The low speed clutch 84 is formed and operates in a similar manner. A plurality of annular friction clutch surfaces 192 are keyed at their inner peripheries to keys on a housing 194 keyed for rotation with shaft 22. A second set of annular friction clutch surfaces 196 are disposed between friction clutch surfaces 192 and are keyed at their outer peripheries to the clutch drive ring 82 attached to gear 76. A clutch piston 198 is movable within a cylinder 200 formed in housing 202. Air seals 204 are mounted between the piston 198 and the cylinder 200. An air passageway 206 extends from the groove 166 to the cylinder 200. When the low speed clutch 84 is de-energized, friction clutch surfaces 192 and 196 rotate relative to one another and rotative motion is not applied from the gear 76 to the shaft 22.

When pressurized air is applied through aperture 164, groove 166 and passageway 206 to the cylinder 200, the clutch piston 198 is forced against the friction clutch surfaces 192 and 196. The friction clutch surfaces are thereby engaged, and rotative motion is applied from the gear 76, through the clutch drive ring 82 and the friction clutch surfaces 192 and 196 to the shaft 22.

The brake 88 includes a stationary housing 210 which engages the outer peripheries of annular friction clutch surfaces 212. A second set of friction clutch surfaces 214 are disposed between surfaces 212 and are keyed at their inner peripheries to keys in a housing 216 keyed for rotation with shaft 22. A pair of annular brake plates 218 and 220 are disposed on opposite sides of the friction surfaces 212 and 214. A bolt 222 is disposed through the brake plate 218, with the head of the bolt 224 fitting within the counterbore within the brake plate 218. The threaded end 226 of the bolt 222 is threadedly engaged in the clutch piston 182. A spring 228 is disposed between the brake plate 218 and a washer 230. A packing or O-ring 232 is disposed between the housing 186 and the washer 230 to provide an air seal.

In a similar manner, a bolt 236 has a head portion 238 received within a counterbore in the annular brake plate 220 and extends through the brake plate 220. A threaded end 240 is received within the clutch piston 198. A spring 242 is disposed between the brake plate 220 and a washer 244. A packing or O-ring 246 is disposed between washer 244 and the housing 202 to provide an air seal thereto.

Brake plates 218 and 220 are laterally movable along a key 250 extending from housing 216. Stop portions 252 and 254 extend from the brake plates 218 and 220 in order to limit movement of the brake plates.

Bolts 222 and 236 thus rigidly interconnect adjacent brake plates and clutch pistons in order to automatically release the brake upon energization of either of the clutches. Springs 228 and 242 automatically cause the engagement of the brake when both of the clutches are de-energized. An important aspect of the invention is that upon energization of one of the clutches, the brake is momentarily maintained in an energized condition prior to full engagement of the clutch. For example, if the high speed clutch 62 is engaged, the movement of the clutch piston 182 causes movement of the brake plate 218 away from the friction clutch surfaces. The force of the spring 242 causes movement of the brake plate 220 in order to maintain engagement of the brake for a short time interval, until the stop portion 254 hits against the key 250. At this time, the brake is de-energized. The short delay before disengagement of the brake tends to prevent the press drive from backing up during inching operations instead of the press. Moreover, the time delay feature of the brake assembly provides a short application of the brake during a change of speed by the clutch to assist in the change of speed.

Figure 3:
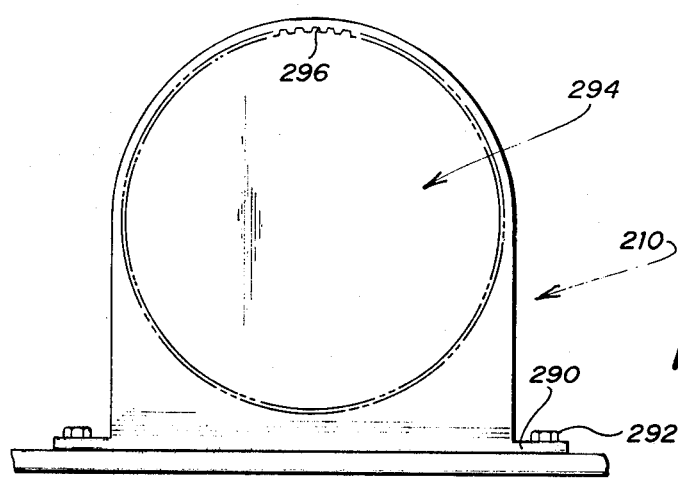
FIG. 3 is a side view of the brake housing of the invention.

FIG. 3 illustrates in greater detail the construction of the brake housing 210. The housing includes flanges 290 for receiving bolts 292 to rigidly connect the housing to the frame of the transmission. The housing includes a central cutout portion 294 for receiving the shaft 22 in the brake assembly as previously described. Gear teeth 296 are defined about the inner periphery of the central opening of the housing 210 for receiving the outer edges of the friction clutch surfaces of the brake assembly.

Figure 4:
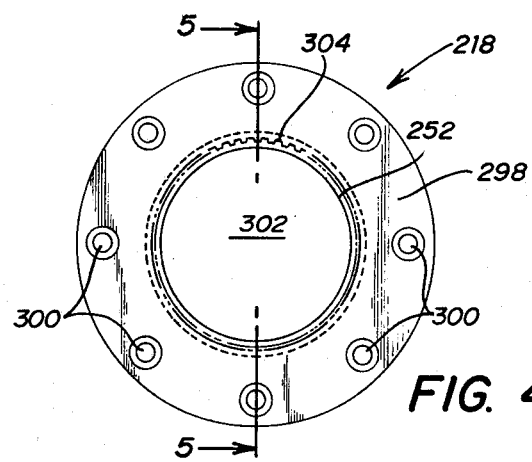
FIG. 4 is a side view of the annular brake plate.
Figure 5:
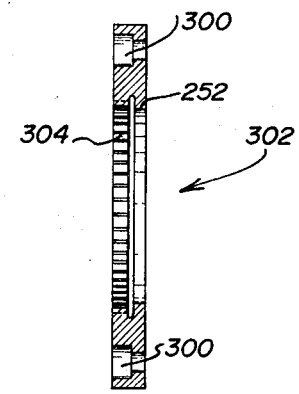
FIG. 5 is a sectional view through the annular brake plate of FIG. 4 taken generally along the section lines 5—5.

FIGS. 4 and 5 illustrate the construction of the brake plates 218 and 220 in greater detail. As seen from the drawings, the brake plates comprise an annular metal plate 298 having apertures 300 defined about the periphery thereof for receiving the bolts 222 and 236. A central aperture 302 is formed through the brake plate for receiving the shaft 22. Gear teeth 304 are formed about the interior periphery of the brake plate for receiving the keys 250 of the housing 216. The stop portions 252 are illustrated as protruding inwardly from the gear teeth 304 in order to prevent movement of the brake plate past a predetermined position.

Figure 6:
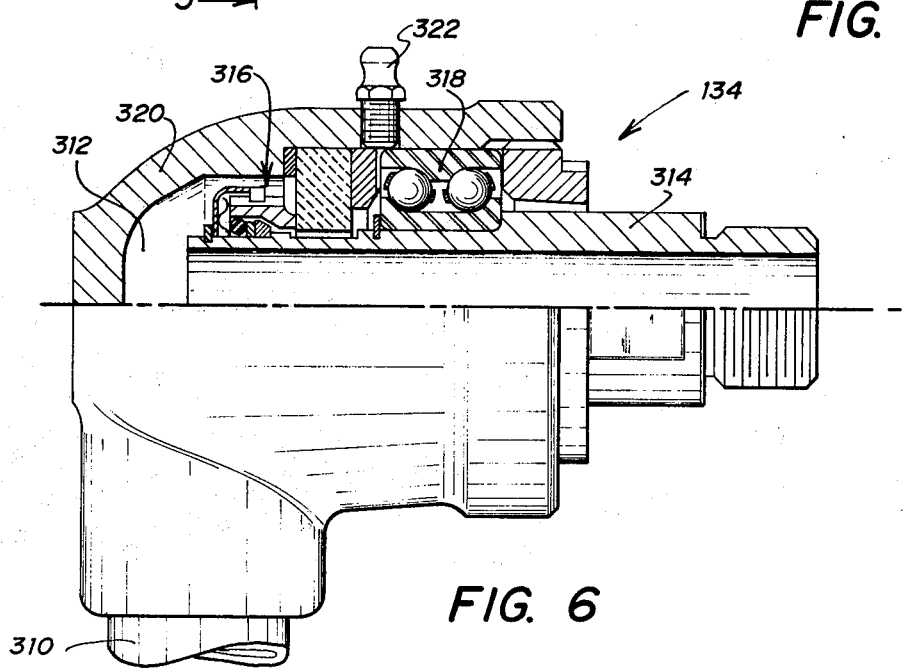
FIG. 6 is a partially sectioned view of the air inlet of the system shown in FIG. 1.

FIG. 6 illustrates a partially broken away view of the air inlet 134 shown in FIG. 1. A source of pressurized air is attached to the inlet pipe 310 and pressurized air is applied to a chamber 312 which opens to an outlet pipe 314. Pipe 314 is connected to the end of shaft 22 and rotates therewith. A sealing assembly is designated generally by the numeral 316 and prevents leakage of the air. A ball bearing assembly 318 is connected between the outer housing 320 and the pipe 314 in order to allow relative rotation therebetween. Lubrication to the bearings may be provided through a plug 322. It should thus be seen that the air inlet shown in FIG. 6 comprises a rotary union which allows air to be passed to a rotating pipe 314 which interfits with the end of shaft 22 in order to provide air to the rotating shaft for operation of the clutches in the manner previously described.

Figure 7:
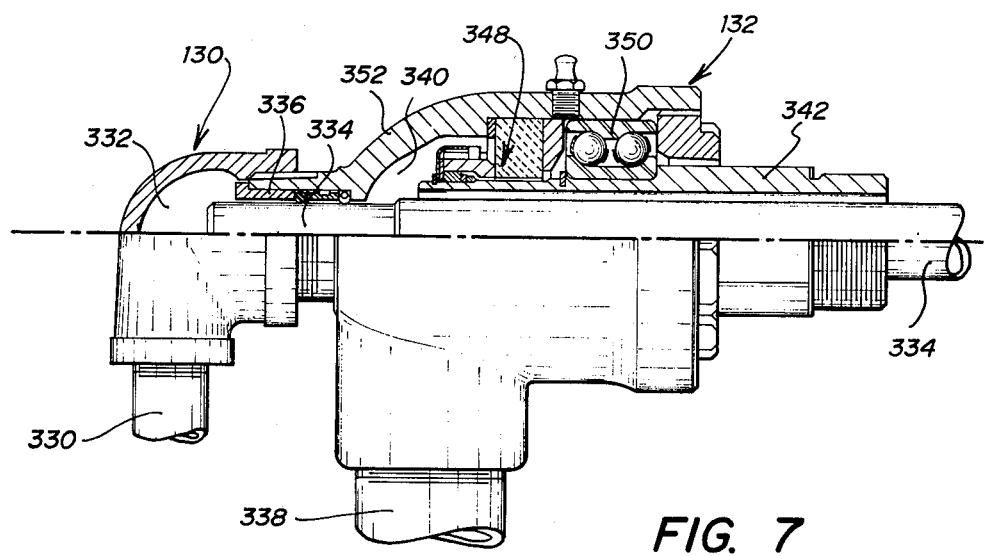
FIG. 7 is a partially sectioned view of the oil and air inlet of the system shown in FIG. 1.

FIG. 7 illustrates a partially sectioned view of the combined air and oil inlet 130 and 132 shown in FIG. 1. Air is applied to an inlet pipe 330 and is applied to a chamber 332 and to a rotating outlet pipe 334. Pipe 334 is journaled in a bearing 336 which also contains structure for sealing against the escape of air. Pipe 334 extends into connection with the end of shaft 22 to admit pressurized air through the apertures therein for operation of the clutches in the manner previously described.

Oil is provided to an inlet pipe 338 and is applied to a chamber 340 and passes between the housing 342 and the pipe 334. The housing 342 is connected to the aperture 168 (FIG. 1) formed in shaft 22 for application of oil to the clutch assembly of the invention. Suitable sealing members 348 are connected to prevent the passage of oil. Ball bearings 350 are provided to enable rotation of the shaft 342 with the housing 352. The apparatus shown in FIG. 7 thus comprises a double rotary union for application of oil and air to the end of the rotating shaft 22.

Figure 8:
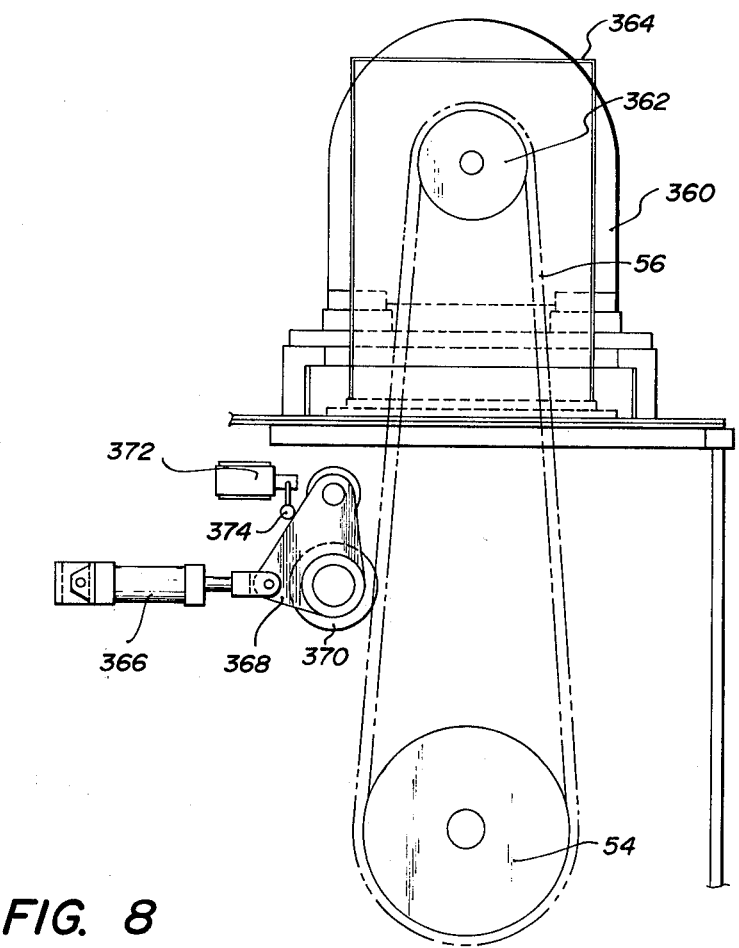
FIG. 8 is an end view of the drive motor assembly for use with the present invention.

FIG. 8 illustrates structure for applying rotation to the flywheel pinion shaft 44 shown in FIG. 1. A motor 360 may comprise any suitable electrical motor for rotating an output shaft and sprocket or pulley 362. The output sprocket 362 may be contained within a housing 364 if desired. A belt 56 is engaged by the pulley 362 and extends about the pulley 54 attached to the flywheel pinion shaft 44 in the manner previously described. As noted, pulleys 54 and 362 may comprise sprockets, and the belt 56 may be replaced by a chain. An air cylinder 366 is connected to a pickup bracket 368 including a wheel 370. Cylinder 366 may be selectively operated to take up slack on the belt or chain 56. A limit switch 372 may be selectively operated in order to sense excessive change, slack or broken chain by use of a feeler 374 in order to stop operation of the system before damage occurs.

It will be understood that various types of clutch and brake assemblies may be utilized with the present system. FIG. 9 illustrates an alternative clutch and brake system for use with the present invention, wherein like numerals are utilized for like and corresponding parts of the various drawings. Shaft 22 includes an aperture 380 for receiving pressurized air from the air inlet 130 and aperture 382 for receiving pressurized air from the air inlet 134 in the manner shown in FIG. 1. A passageway 384 is formed through shafts 22 for receiving oil from the oil inlet 132. An oil passageway 386 extends through a clutch housing 388 to deliver oil thereto. An oil passageway 390 communicates with the passageway 384 to deliver oil through a passageway 392 in a clutch housing 394 to deliver oil to the low speed clutch 84.

The high speed clutch 62 comprises opposed sets of friction clutch surfaces in the manner of that shown in FIG. 2. One set of friction clutch surfaces are engaged at the outer peripheries with the reduction pinion 60 attached to the flywheel 32. The second set of friction clutch surfaces are attached at their inner peripheries to keys on a clutch housng 396 which is keyed to the shaft 22. An outer housing 400 is movable relative to the housing 396 and is connected by a bolt 402 to an outer brake housng 404a. A spring 406 biases the housing 404a against the housng 396. An air passageway 408 extends between the aperture 380 and a chamber 410 formed between the housing 400 and the housing 396. When pressurized air is applied to the chamber 410, the housing 400 is moved to engage the high speed friction clutch surfaces. When pressurized air is not applied to the chamber 410, the spring 406 biases the housing 400 away from the high speed friction clutch surfaces to de-energize the clutch.

In a similar manner, an annular housing 414 is keyed to the shaft 22. An air passageway 416 provides pressurized air from the aperture 382 to a chamber 418 formed between housing 414 and an outer housing 420. The low speed clutch 84 comprises a first set of friction clutch surfaces engaged at their outer peripheries with the drive ring 82. A second set of friction clutch surfaces are engaged at their inner peripheries with the housing 414. Outer housing 420 is connected by a bolt 424 with brake housing 404b. A spring 430 is disposed between brake housing 404b and housing 414. Upon the admission of pressurized air through passageway 416 to chamber 418, the housing 420 is moved to engage the low speed friction clutch surfaces. When pressurized air is not applied to chamber 418, spring 430 moves the housing 404b and the outer housing 420 out of engagement with friction clutch surfaces.

The brake assembly 88 comprises a housing 450 rigidly connected by bolts 451 to a rigid frame. Housing 450 includes teeth which engage the outer periphery of a plurality of friction clutch surfaces in the manner previously described. A second set of brake friction clutch surfaces are keyed at their inner peripheries with a housing 452 keyed to shaft 22. When both of the high and low speed clutch assemblies are de-energized, the brake housings 404a and 404b are forced to engage the brake friction surfaces to engage the brake. Abutment surfaces 460a and 460b are formed on housings 404a and 404b, respectively, in order to engage the housing 452. This enables the brake to be energized for a short time prior to full energization of the clutch assembly, in the manner previously described.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A transmission system for a press machine comprising:
   an oil housing to provide lubrication therein,
   a shaft rotatably mounted within said oil housing,
   a flywheel rotatably mounted within said oil housing,
   a motor located outside said housing,
   a drive shaft rotatably extending through the wall of said housing, oil seal means for preventing the passage of oil between said drive shaft and said housing wall, means connected between said motor and said drive shaft for rotating said drive shaft, a gear formed on the end of said drive shaft for causing rotation of said flywheel, high speed and low speed clutches mounted adjacent said shaft within said housing, and means for selectively operating said clutches to transmit rotative motion from said flywheel to said shaft through either of said clutches.

2. A transmission system for a press machine comprising:

an oil housing to provide lubrication therein, a shaft rotatably mounted within said oil housing, a flywheel rotatably mounted within said oil housing, means for applying rotation to said flywheel from outside said oil housing, high speed and low speed clutches mounted adjacent said shaft within said housing, means for selectively operating said clutches to transmit rotative motion from said flywheel to said shaft through either of said clutches, and brake means disposed between said clutches and operable to brake said shaft when neither clutch is engaged.

3. A transmission system for a press machine comprising:

an oil housing to provide lubrication therein, a shaft rotatably mounted within said oil housing, a flywheel rotatably mounted within said oil housing, means for applying rotation to said flywheel from outside said oil housing, high speed and low speed clutches mounted adjacent said shaft within said housing, means for selectively operating said clutches to transmit rotative motion from said flywheel to said shaft through either of said clutches, and apertures formed through said shaft for admission of lubricating oil and fluid for energizing said clutches.

4. A clutch system comprising:

a rotatable shaft, a flywheel rotatably mounted on an end portion of said shaft, means for rotating said flywheel, a high speed clutch assembly including friction clutch surfaces mounted about said shaft and engaged with said flywheel, a low speed clutch assembly spaced from said high speed clutch assembly and including friction clutch surfaces mounted about said shaft, a freely rotatable idler gear having a first gear which meshes with a gear on said flywheel and a second gear which meshes with a gear engaging said low speed clutch assembly in order to transmit rotative motion from said flywheel to said low speed clutch assembly, a brake assembly disposed between said low and high speed clutch assemblies and including a plurality of friction surfaces mounted about said shaft, and means for selectively engaging either of said clutch assemblies to transmit rotation from said flywheel to said shaft while concurrently disengaging said brake assembly.

5. The clutch system of claim 4 and further comprising:

means for maintaining the engagement of said brake assembly for a predetermined time interval during the engagement of either of said clutch assemblies.

6. The clutch system of claim 5 and further comprising:

means for varying said predetermined time interval.

7. The clutch system of claim 4 and further comprising:

pistons for selectively engaging said clutch assemblies, brake plates for engaging said brake assembly, and means for rigidly interconnecting adjacent pistons and brake plates.

8. The clutch system of claim 7 wherein said interconnecting means comprise a plurality of bolts annularly spaced about said shaft.

9. The clutch system of claim 8 and further comprising:

springs disposed about said bolts for normally biasing said brake plates against said brake assembly.

10. The clutch system of claim 7 wherein said brake plates include a stop portion for limiting the travel of said brake plates toward said brake assembly.

11. The clutch system of claim 4 wherein said flywheel is located within an oil housing and said means for rotating said flywheel is located outside the oil housing.

12. The clutch system of claim 6 and further comprising:

an intermediate shaft for receiving rotative drive from said shaft and extending through and rotatably supporting said idler gear.

13. A transmission system for a press machine comprising:

a lubrication housing, a rotatable shaft wholly mounted in said housing, a flywheel supported by and rotatably mounted on said shaft, means for rotating said flywheel from outside said housing, a first speed clutch mounted on said shaft adjacent said flywheel and including a plurality of first friction clutch surfaces, first gear means attached to said flywheel and engaging the outer peripheries of ones of said first friction clutch surfaces, a second speed clutch mounted on said shaft and spaced from said flywheel and including a plurality of second friction clutch surfaces, second gear means rotatably mounted on said shaft and engaging the outer peripheries of ones of said second friction clutch surfaces, third gear means meshing with said first and second gear means for transmitting rotation from said flywheel to said second speed clutch, and means for selectively energizing either of said clutches to transmit rotation from said flywheel to said shaft.

14. The transmission system of claim 13 wherein said means for rotating comprises:

a motor located outside said housing, a drive shaft rotatably extending through the wall of said housing, oil seal means for preventing the passage of oil between said drive shaft and said housing wall, means connected between said motor and said drive shaft for rotating said drive shaft, and a gear formed on the end of said drive shaft for causing rotation of said flywheel.

15. A transmission system for a press system comprising:
   an enclosed oil housing,
   a shaft rotatably mounted in said housing,
   a flywheel rotatably mounted on said shaft within said housing,
   a motor mounted outside said housing,
   a gear extending through said housing and engaging said flywheel,
   means for transmitting rotation from said motor to said gear to rotate said flywheel,
   clutch means on said shaft for being engaged to transfer rotation from said flywheel to said shaft, and
   a brake within said oil housing for being automatically engaged when said clutch means are de-energized.

16. The transmission system of claim 15 wherein said clutch means are fluid actuated,
   apertures formed through said shaft for receiving fluid, and
   stationary fluid inlet means attached to at least one end of said shaft for supplying fluid to said apertures.

17. A transmission system for a press system comprising:
   an enclosed oil housing,
   a shaft rotatably mounted in said housing,
   a flywheel rotatably mounted on said shaft within said housing,
   clutch means on said shaft for being engaged to transfer rotation from said flywheel to said shaft,
   a motor mounted outside said housing,
   means for transmitting rotation from said motor to said flywheel including a drive shaft extending through said housing and having a gear on one end,
   a flywheel gear formed on said flywheel for meshing with said gear on said drive shaft, and
   a reduction pinion connected to said flywheel for engagement with said clutch means.

18. The transmission means of claim 17 and further comprising:
   an idler gear for engaging with a surface of said reduction pinion.

* * * * *